US010893347B2

(12) United States Patent
Lo et al.

(10) Patent No.: US 10,893,347 B2
(45) Date of Patent: Jan. 12, 2021

(54) INTELLIGENT AUDIO PLAYBACK AND COMMUNITY SHARING SYSTEM

(71) Applicant: PIO NETWoRKING PTE. LTD.

(72) Inventors: Tien-Szu Lo, Taipei (TW); Tien-Yu Lo, Taipei (TW)

(73) Assignee: PIO NETWORKING PTE. LTD., Singapore (SG)

( * ) Notice: Subject to any disclaimer, the term of this patent is extended or adjusted under 35 U.S.C. 154(b) by 0 days.

(21) Appl. No.: 16/389,776

(22) Filed: Apr. 19, 2019

(65) Prior Publication Data
US 2020/0336815 A1    Oct. 22, 2020

(51) Int. Cl.
| H04B 5/00 | (2006.01) |
| H04R 1/02 | (2006.01) |
| G06F 16/64 | (2019.01) |
| G06F 16/683 | (2019.01) |
| H04R 3/00 | (2006.01) |
| G11B 27/031 | (2006.01) |
| G06F 16/635 | (2019.01) |
| G06K 19/07 | (2006.01) |
| H04B 3/00 | (2006.01) |

(52) U.S. Cl.
CPC ........... *H04R 1/028* (2013.01); *G06F 16/635* (2019.01); *G06F 16/64* (2019.01); *G06F 16/683* (2019.01); *G06K 19/0723* (2013.01); *G11B 27/031* (2013.01); *H04R 1/025* (2013.01); *H04R 3/00* (2013.01)

(58) Field of Classification Search
CPC .......... H04R 1/028; H04R 1/025; H04R 3/00; G06F 16/64; G06F 16/683; G06F 16/635; G06K 19/0723; G11B 27/031
USPC ...................................... 381/79, 77
See application file for complete search history.

(56) References Cited

U.S. PATENT DOCUMENTS

| 2011/0213769 A1* | 9/2011 | Handman | G11B 27/11 707/722 |
| 2015/0100143 A1* | 4/2015 | Gao | H04H 20/18 700/94 |
| 2016/0342381 A1* | 11/2016 | Song | G06K 7/10366 |
| 2020/0050953 A1* | 2/2020 | Fischbacher | G06N 5/045 |

* cited by examiner

*Primary Examiner* — Ammar T Hamid
(74) *Attorney, Agent, or Firm* — Chun-Ming Shih; Lanway IPR Services

(57) ABSTRACT

An intelligent audio playback and community sharing system is disclosed, comprising a backend server equipment, an object body combined with an RFID tag, a sound box device, and an application program installed within an electronic device, wherein the backend server equipment stores at least one object file such that, after the object body is placed on the sound box device, the sound box device can search inside the local device or the backend server equipment and play back the audio signals corresponding to the RFID tag; moreover, the user can add or change the audio signals which each RFID tag corresponds to via the application program so that the sound box device can play back music or audio files of any suitable forms in accordance with the user's needs.

12 Claims, 24 Drawing Sheets

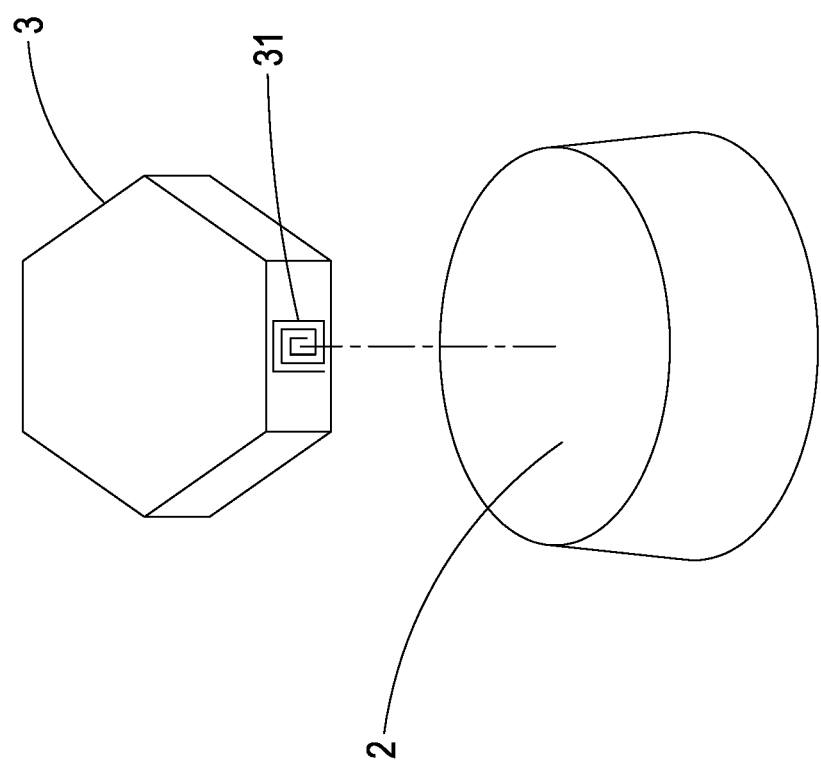

| < Back | Create Community | |
|---|---|---|
| Community Name | | |
| Community URL | | |
| Community Type | Please select community type > | |
| Community Type | Public | Private |
| Community Permission | Follow only | Allowed to join |
| Community Descriptions | | |

4111

Next

| < Back | Message Board | Reply |

Topic Initiator ID  2018-09-28

XXXXXXXXXXXXXXXXXXXXXXXXXXXXX
XXXXXXXX......

| Agree 25 | Disagree 25 | Join Discussion | widir  2018-09-28

XXXXXXXXXXXXXXXXXXXXXXXXXXXXX
XXXXXXXX......

| Agree 25 | Disagree 25 |

4111

*FIG.12*

INTELLIGENT AUDIO PLAYBACK AND COMMUNITY SHARING SYSTEM

BACKGROUND OF THE INVENTION

1. Field of the Invention

The present invention generally relates to an intelligent audio playback and community sharing system; in particular, it relates to a playback and sharing system capable of autonomously editing and associating sound tracks, as well as sharing audios by way of communities.

2. Description of Related Art

In modern days, sound boxes become a type of playback devices to let people enjoy listening to music, and, as digital storage technologies advance, wireless applications can now be extended to sound box devices as well; currently it is possible to install a built-in Bluetooth™ signal receiver within a common wireless sound box in order to set up peer-to-peer connection to the wireless sound box by means of the built-in Bluetooth™ connection function of a mobile phone.

Currently, most of the speakers on the market are used for voice assistants and streaming music playback, so less considerations are given to sharing and interactivity features. If a user wants to update and find the audio files he/she needs, it will be quite challenging as well.

In addition, since the current use of the sound boxes highly depends on the mobile phone, if a user wants to play music, most of them will directly connect with the mobile phone, and the audio file will be transferred to the speaker for wireless play back via the mobile phone. However, once the mobile phone and the sound box are disconnected, the sound box itself cannot autonomously perform music playback. Therefore, it is very important to be able to play the audio file autonomously in an offline state or in an environment without networks.

As such, it would be an optimal solution if it is possible to allow the user to place an object having an RFID tag on the sound box and directly connect to a backend server equipment in order to automatically play the audio files set by the application (APP) on the user's mobile phone, and, moreover, if it is also possible to store specific audio files in the sound box through the settings of the mobile phone, so that even under an offline condition or in an environment without networks, the same or different users can listen to different audio contents merely by way of the pairing between the sound box and the object having the RFID tag.

SUMMARY OF THE INVENTION

An intelligent audio playback and community sharing system according to the present invention is disclosed, comprising: a backend server equipment, applied to store at least one object file and at least one community file, in which the object file includes at least one or more audio files and/or audio connections; an object body, combined with at least one RFID tag; a sound box device, capable of storing at least one audio signal files and including: a microcontroller, used to control the operations of the sound box device; a speaker body, connected to the microcontroller in order to play audio signals; an RFID reader, connected to the microcontroller thereby that, after the object body touches the sound box device, the RFID reader can read the wireless radio frequency (RF) information on the RFID tag of the object body; a wireless transmission unit, connected to the microcontroller, which can be applied to perform wireless network connections with the backend server equipment in a wireless way and, based on the wireless RF information received by the RFID reader, acquire the corresponding object file in the backend server equipment; wherein the sound box device can play back, through the speaker body, the audio signals originated from the stored audio signal files or the object file acquired in the backend server equipment; an application program, installed in an electronic device and comprising: an operation interface unit, used to provide different operation pages necessary for running the application program; a connection unit, used to connect to the backend server equipment via the electronic device; an object file management unit, connected to the connection unit and the operation interface unit and used for adding and/or editing object files on the operation page provided by the operation interface unit, and then uploading the added and/or edited object files to the backend server equipment, in which different object files correspond to different wireless RF information; a community operation unit, connected to the connection unit and the operation interface unit and used for creating a new community or operating in a created community on the operation page provided by the operation interface unit, and then the generated data though operations can be stored as the community file and uploaded to the backend server equipment, in which the community operation unit can publish at least one audio file and/or audio link in at least one community on the operation page provided by the operation interface unit; an audio editor unit, connected to the object file management unit, the operation interface unit and the community operation unit and used for editing and creating a new audio file on the operation page provided by the operation interface unit; and an audio pairing unit, connected to the object file management unit, the operation interface unit and the community operation unit and used for adding at least one new audio file and/or audio link into at least one object file on the operation page provided by the operation interface unit.

More specifically, the above-said application program further comprises an account management unit connected to the connection unit and the operation interface unit and used for adding or editing a user file having at least a user account and a password on the operation page provide by the operation interface unit, and the user file can be uploaded and stored to the backend server equipment, with each user file being correspondingly installed with at least one object file.

More specifically, the above-said application program further comprises an account log-in unit connected to the connection unit and the operation interface unit and used for inputting the user account and password on the operation page provided by the operation interface unit in order to perform the account log-in process.

More specifically, the above-said object file management unit can further edit the playback sequence of different audio files and/or audio links.

More specifically, the above-said object file management can further edit the name of the object file, user's name, WiFi name, WiFi password, and/or language.

More specifically, the above-said community operation unit can further share the audio files and/or audio links published on the operation page by way of a communication software, a community software and/or an email software.

More specifically, the above-said community operation unit can further leave a comment and/or tab for ratings in at least one community on the operation page.

More specifically, the above-said community operation unit can further configure access permissions of different community files thereby limiting the users that the community can operate.

More specifically, the above-said community operation unit can be further used to invite different users to enter into at least one community.

More specifically, the above-said community operation unit can be further used to delete the audio files and/or audio links published in at least one community on the operation page.

More specifically, the above-said community operation unit can be further used to allow one or more users to publish a plurality of consecutive or associated audio files and/or audio links on the operation page.

More specifically, the above-said community operation unit can further correspondingly specify an accumulative point with respect to each audio file and/or audio link in the community, and the accumulative point can be shown on the operation page.

More specifically, the above-said audio editor unit provides functions including audio recording, sound effect editing, audio stitching, text-to-speech conversion, audio file link input and/or audio file import etc.

More specifically, the above-said audio pairing unit can add the audio files and/or audio links published in at least one community on the operation page into at least one object file.

More specifically, the above-said application program further comprises a statistics unit connected to the connection unit and the operation interface unit and used for statistically computing the usage count of the object file, the usage count of the audio file, and/or the usage count of the audio signal connection.

More specifically, the above-said RFID tag can be directly combined with the object body, or alternatively attached to the object body through a sticker having the RFID tag.

More specifically, the above-said electronic device is a handheld smart device, a notebook computer or a tablet computer.

BRIEF DESCRIPTION OF THE DRAWINGS

FIG. 1B shows a view of the intelligent audio playback and community sharing system according to the present invention, in which the sound box device and the object body are separated.

FIG. 5A shows an implementation view of editing object file data in the intelligent audio playback and community sharing system according to the present invention.

FIG. 8A shows an implementation view of community functions in the intelligent audio playback and community sharing system according to the present invention.

FIG. 10 shows an implementation view of task publishing in the intelligent audio playback and community sharing system according to the present invention.

FIG. 12 shows an implementation view of the message board in the intelligent audio playback and community sharing system according to the present invention.

DETAILED DESCRIPTION OF THE PREFERRED EMBODIMENTS

Figure 1A:
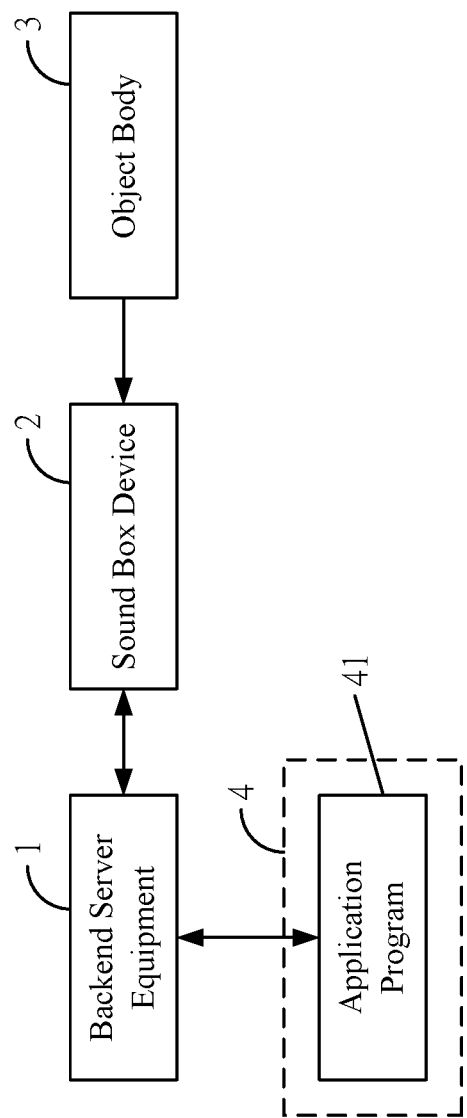
FIG. 1A shows an integral structure view of the intelligent audio playback and community sharing system according to the present invention.
Figure 1C:
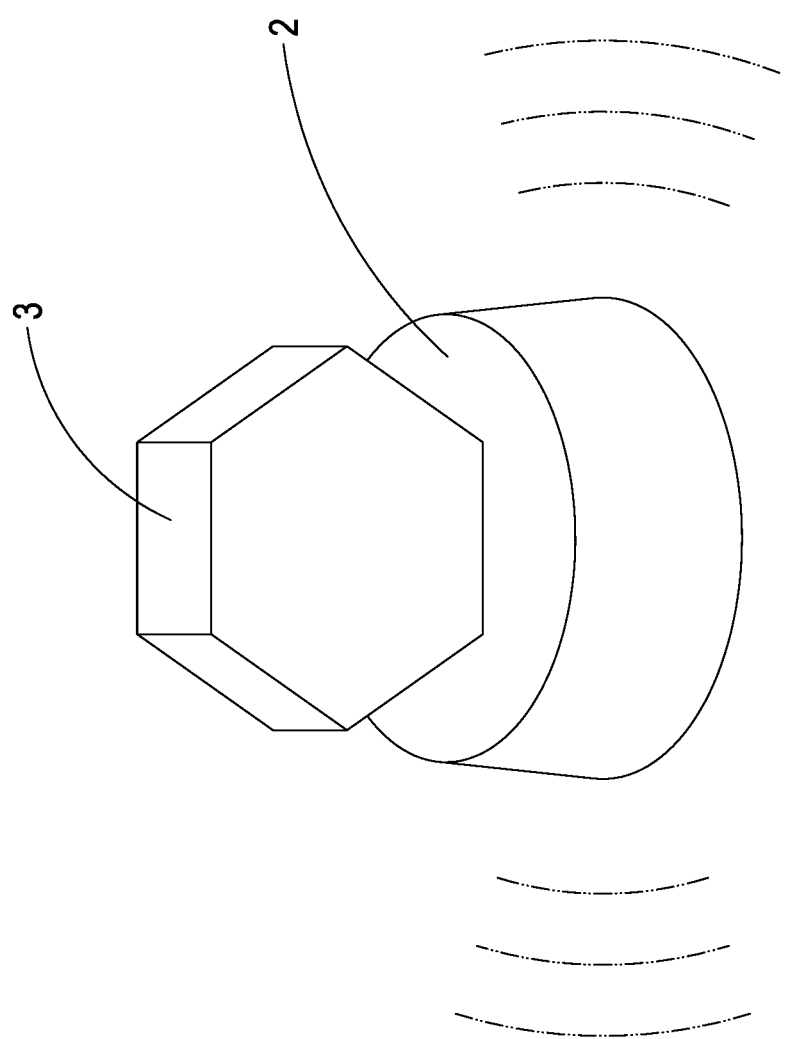
FIG. 1C shows a view of the intelligent audio playback and community sharing system according to the present invention, in which the sound box device and the object body are combined.
Figure 2:
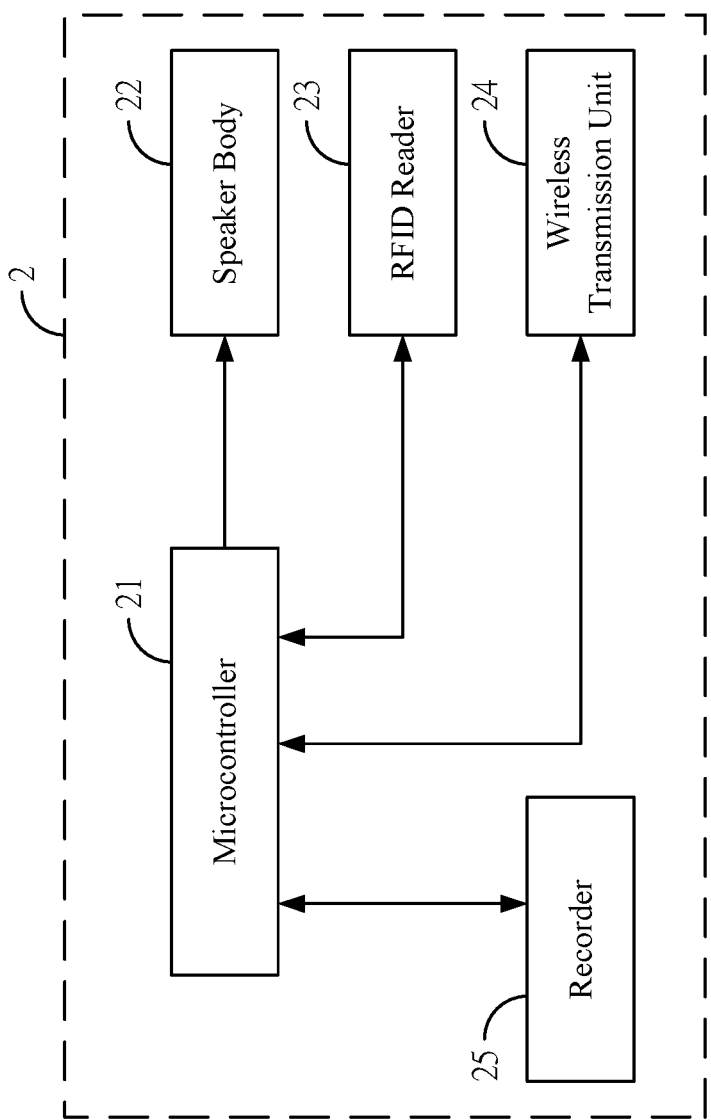
FIG. 2 shows a structure view of the sound box device in the intelligent audio playback and community sharing system according to the present invention.
Figure 3:
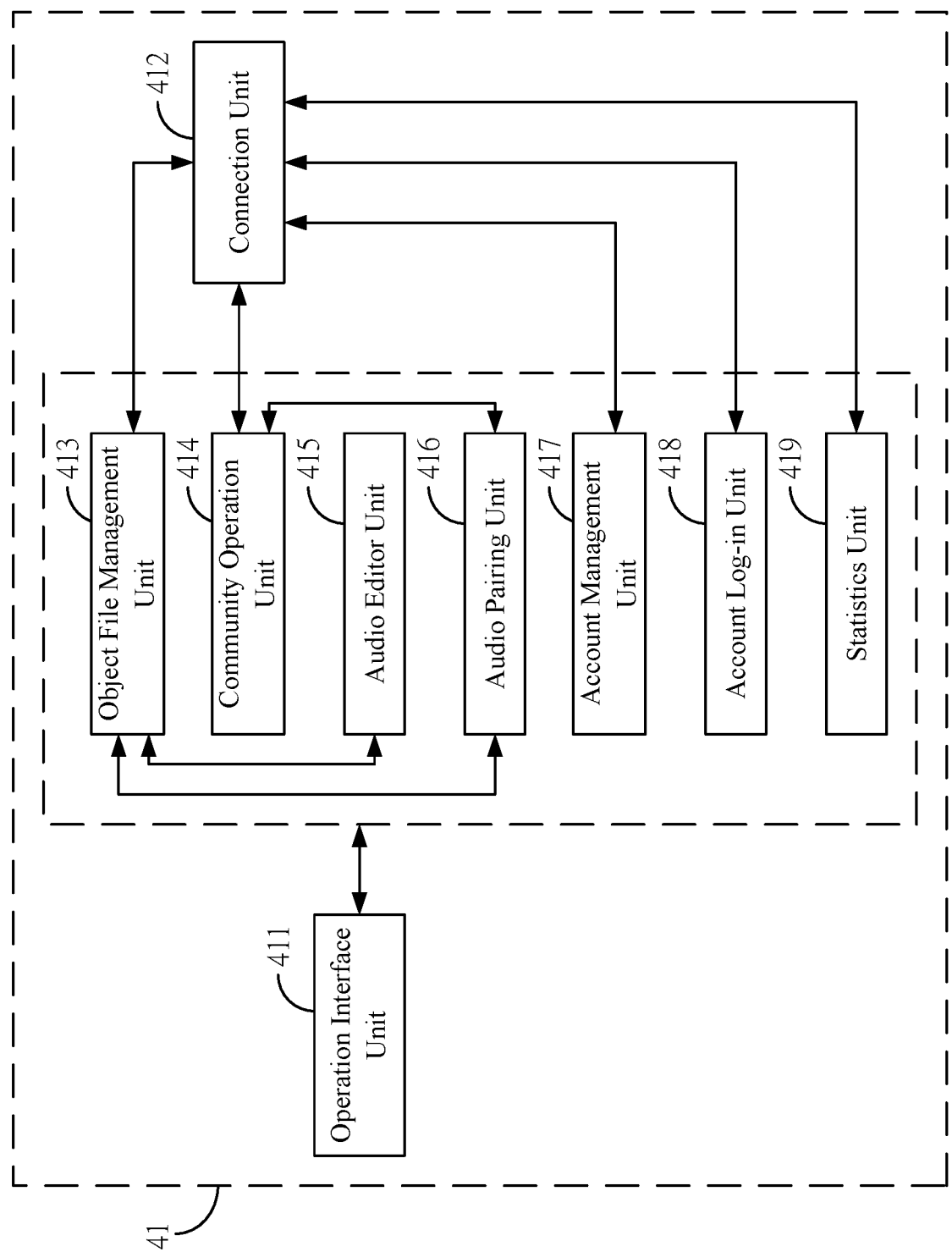
FIG. 3 shows a structure view of the application program in the intelligent audio playback and community sharing system according to the present invention.

Other technical contents, aspects and effects in relation to the present invention can be clearly appreciated through the detailed descriptions concerning the preferred embodiments of the present invention in conjunction with the appended drawings.

Refer first to FIGS. 1A, 1B, 1C, 2 and 3, wherein an integral structure view, a view in which the sound box device and the object body are separated, a view in which the sound box device and the object body are combined, a structure view of the sound box device as well as a structure view of the application program, in the intelligent audio playback and community sharing system according to the present invention are respectively shown, and it can be appreciated from these Figures that the intelligent audio playback and community sharing system according the present invention comprises a backend server equipment 1, a sound box device 2, an object body 3 and an application program 41 installed within an electronic device 4, wherein the electronic device 4 may be a handheld smart device, a notebook computer or a tablet computer.

Herein the backend server equipment 1 can store at least one object file and at least one community file, and the object file includes at least one or more audio files and/or audio connections; hence, when the object body 3 is placed on the sound box device 2, the sound box device 2 can first read the RFID tag 31 on the object body 3, so that, if the sound box device 2 locally stores the corresponding audio signal files, it will directly play the wanted audio signals; if not, on the other hand, it will connect to the backend server equipment 1 so as to retrieve the corresponding object files thereby playing back the audio signals via the sound box device 2.

The RFID tag 31 can be directly combined with the object body 3, or alternatively attached to the object body 3 by means of a sticker having the RFID tag.

Also, the sound box device 2 comprises a microcontroller 21, a speaker body 22, an RFID reader 23, a wireless transmission unit 24, in which the microcontroller 21 can be used to control the operations of the sound box device 2, the speaker body 22 plays out audio signals, the RFID reader 23 can, after the object body 3 touches the sound box device 2, read the wireless RF information contained in the RFID tag of the object body, and then retrieve the corresponding object file from the backend server equipment 1 by means of the acquired wireless RF information, in order to play the audio signals through the speaker body 22.

Besides, the sound box device 2 further includes a recorder 25 (e.g., a microphone), such that, in addition to audio file playbacks, the recorder 25 can be activated to record after the object body 3 contacts the sound box device 2 thereby recording and creating an audio file which later can be uploaded and saved to the backend server equipment 1.

On the other hand, the application program 41 is installed within the electronic device 4 and includes an operation interface unit 411, a connection unit 412, an object file management unit 413, a community operation unit 414, an audio editor unit 415, an audio pairing unit 416, an account management 417, an account log-in unit 418 and a statistics unit 419.

Herein the operation interface unit 411 is to provide different operation pages necessary for the operations of the application program 4, the connection unit 412 can connect to the backend server equipment 1 via the electronic device 4; meanwhile, and the object file management 413 can add and/or edit object files on the operation page provided by the operation interface unit 411, and upload the added and/or edited object files to the backend server equipment 1, in which different object files correspond to different wireless RF (Radio Frequency) information.

The object file management unit 413 can further edit the playback sequence of different audio files and/or audio links, and the community operation unit 414 can used to create a new community or perform operations in a created community on the operation page provided by the operation interface unit 411, while the generated data can be saved as the community file and uploaded to the backend server equipment 1; besides, the object file management unit 413 can also further edit the name of the object file, user's name, WiFi name, WiFi password and/or language.

In addition, the community operation unit 414 can publish at least one audio file and/or audio link for at least one community on the operation page provided by the operation interface unit 411, and the audio editor unit 415 can edit and build a new audio file on the operation page provided by the operation interface unit 411, in which the audio editor unit 415 can offer various functions including audio recording, sound effect editing, audio stitching, text-to-speech conversion, audio file link input and/or audio file import or the like.

Meanwhile, the audio pairing unit 416 can be used to add at least one new audio file and/or audio link into at least one object file on the operation page provided by the operation interface unit 411, and also to add the audio files and/or audio links published in at least one community on the operation page into at least one object file.

The community operation unit 414 can further provide the following functions:

(1) it can further share the audio files and/or audio links published on the operation page by way of a communication software, a community software and/or an email software, and the community operation unit 414 can further leave a comment and/or tab for ratings in at least one community on the operation page;

(2) it can be used to invite different users to enter into at least one community, and can further configure access permissions of different community files thereby limiting the users that the community can operate;

(3) it can be used to delete the audio files and/or audio links published in at least one community on the operation page;

(4) it can be further used to allow one or more users to publish a plurality of consecutive or associated audio files and/or audio links on the operation page; and (5) it can also correspondingly specify an accumulative point with respect to each audio file and/or audio link in the community, and the accumulative point can be shown on the operation page.

Furthermore, the account management unit 417 can be used to add or edit a user file having at least a user account and a password on the operation page provide by the operation interface unit 411, and the user file can be uploaded and stored to the backend server equipment 1, with each user file being correspondingly installed with at least one object file.

Also, the account log-in unit 418 can be used for inputting the user account and password on the operation page provided by the operation interface unit 411 in order to perform the account log-in process, and the statistics unit 419 can be used for statistically computing the usage count of the object file, the usage count of the audio file, and/or the usage count of the audio signal connection.

Figure 4A:
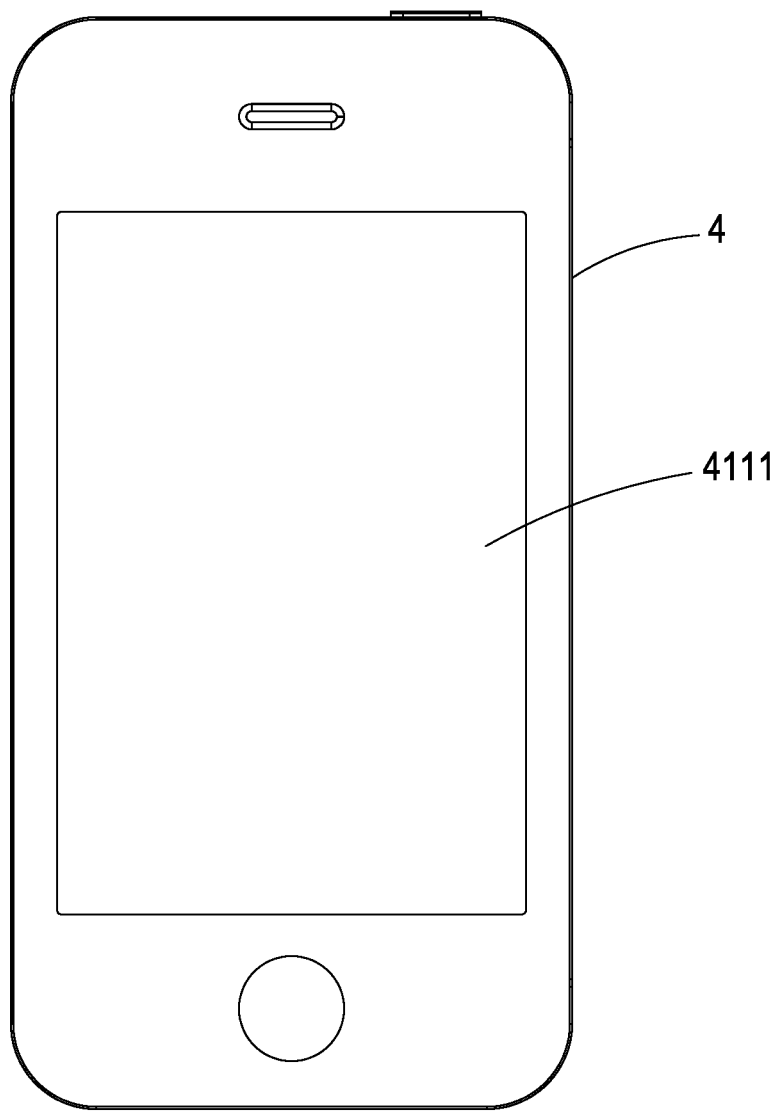
FIG. 4A shows a view of the operation page in the intelligent audio playback and community sharing system according to the present invention.
Figure 4B:
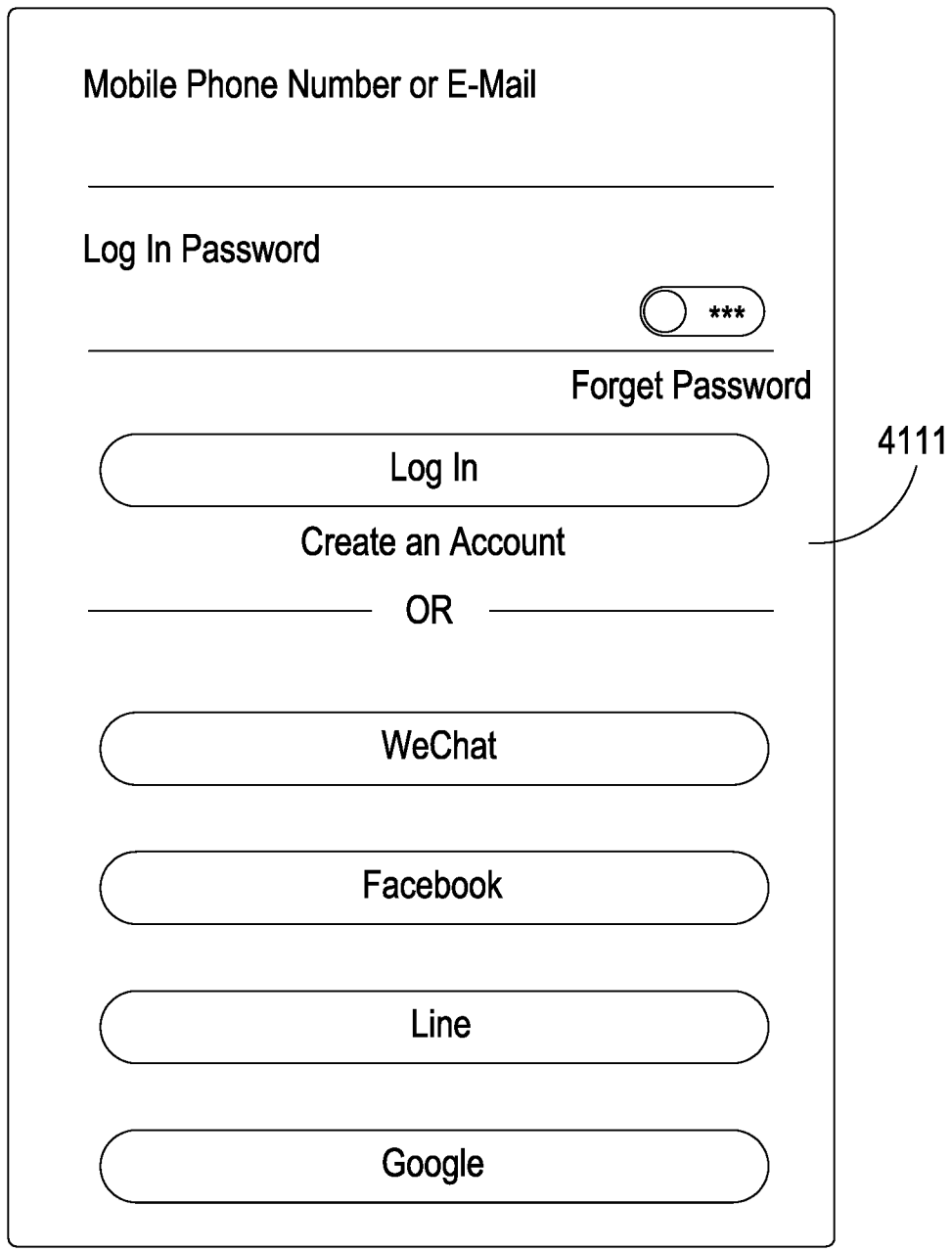
FIG. 4B shows an implementation view of the log-in process in the intelligent audio playback and community sharing system according to the present invention.
Figure 5B:
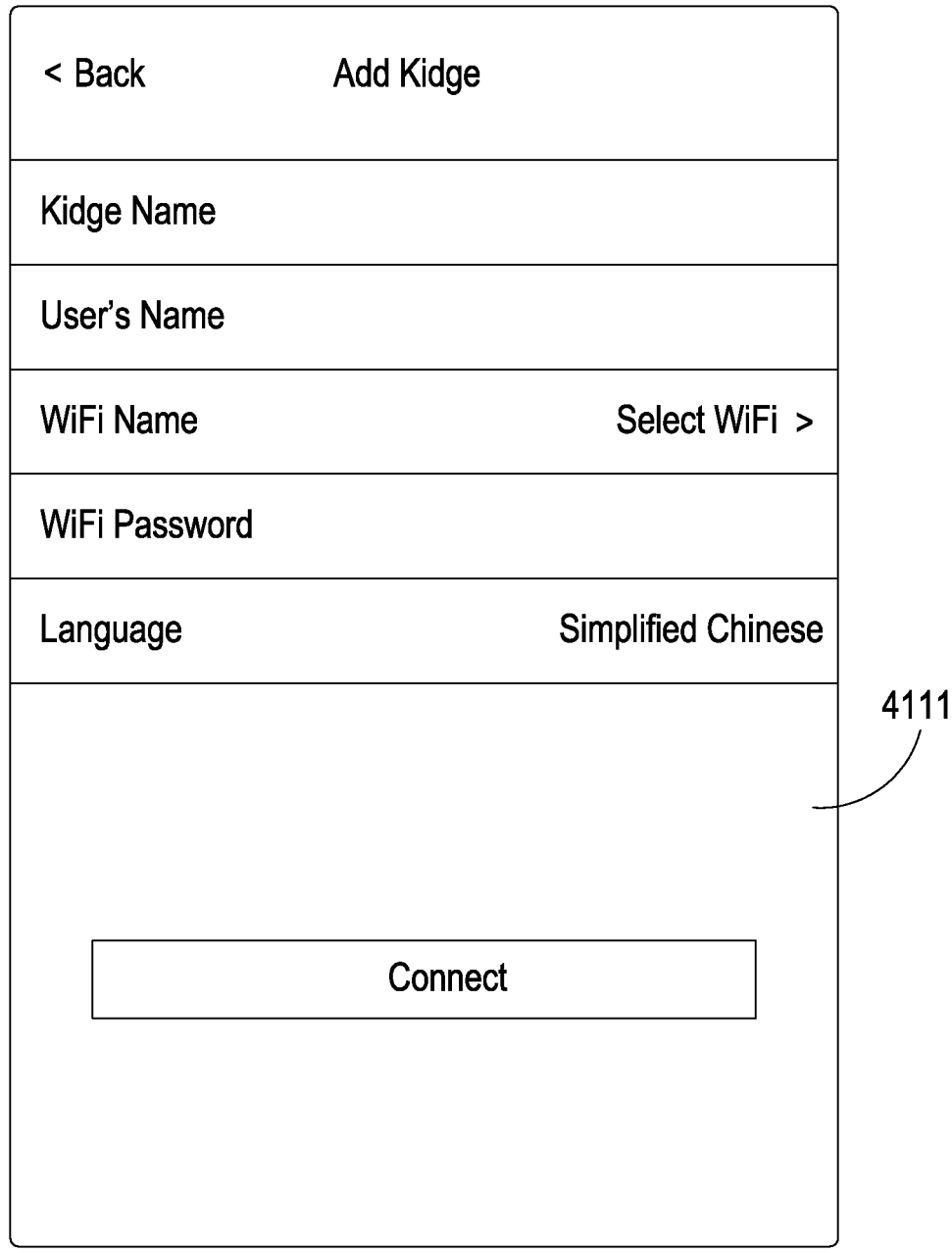
FIG. 5B shows an implementation view of editing object file data in the intelligent audio playback and community sharing system according to the present invention.

To use the application program 41, a user needs first to register a user account, then, as shown in FIGS. 4A and 4B, log into the system to operate; after completing the log-in process, as shown in FIGS. 5A and 5B, the user may first set up or add an object file, and then input or modify the connection method of the object file as well as relevant data.

Figure 6A:
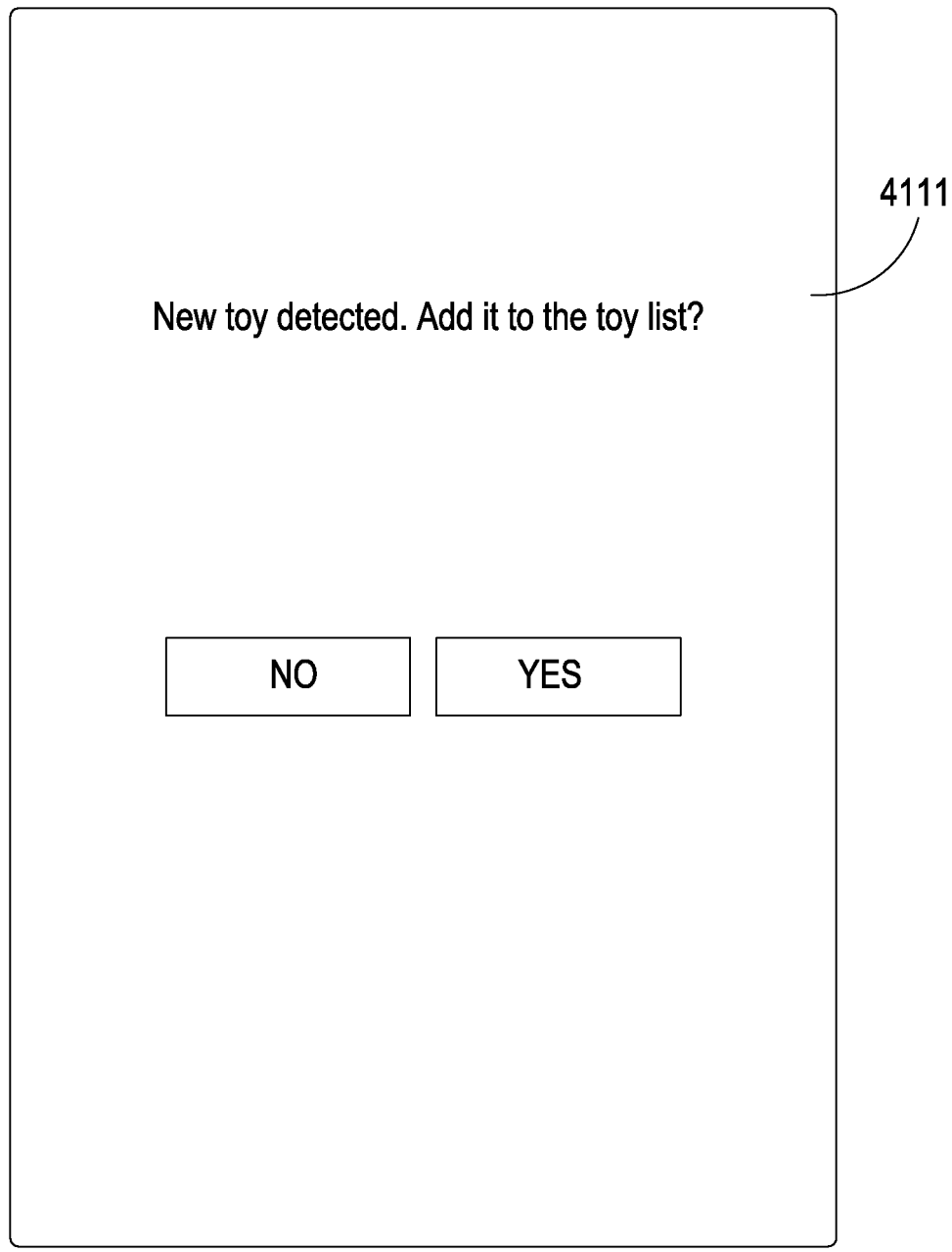
FIG. 6A shows an implementation view of adding an object in the intelligent audio playback and community sharing system according to the present invention.
Figure 6B:
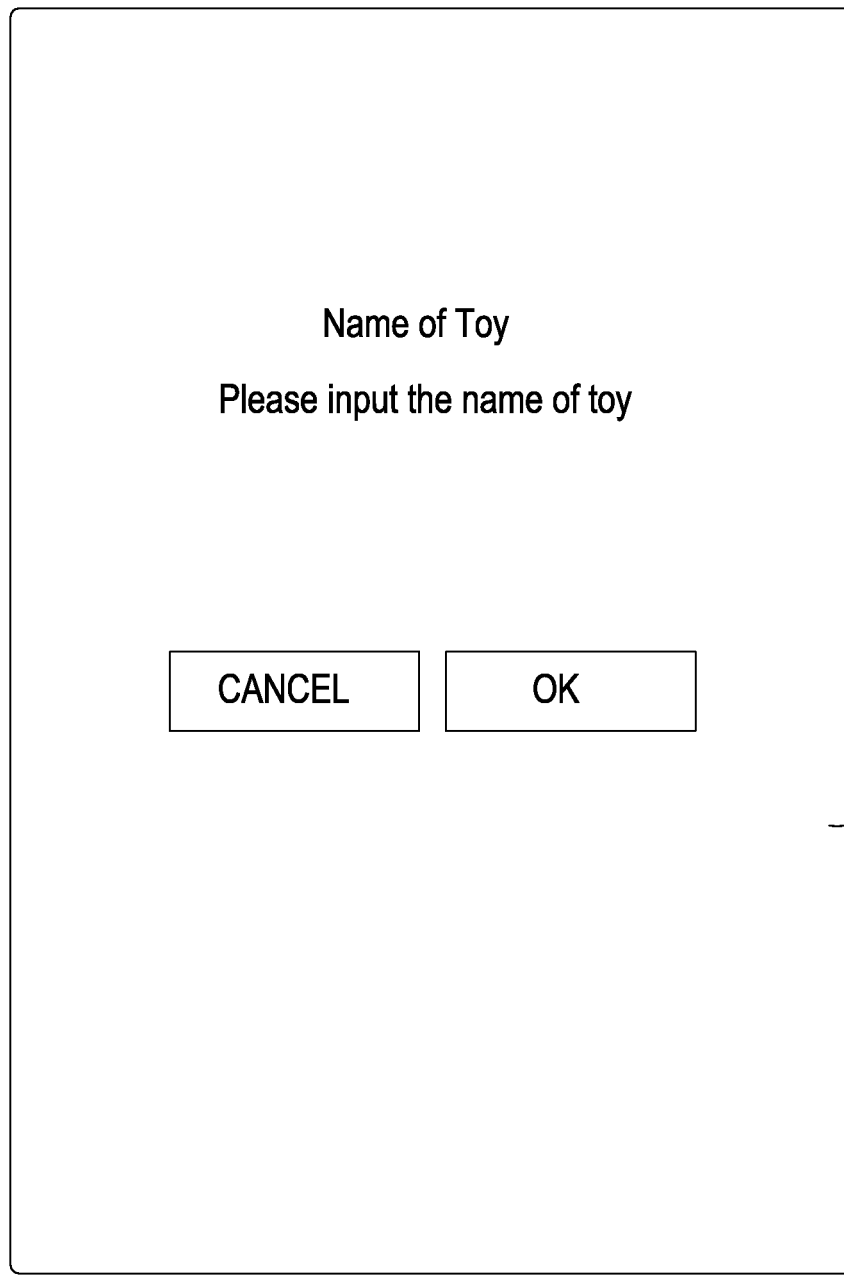
FIG. 6B shows an implementation view of adding an object in the intelligent audio playback and community sharing system according to the present invention.
Figure 6C:
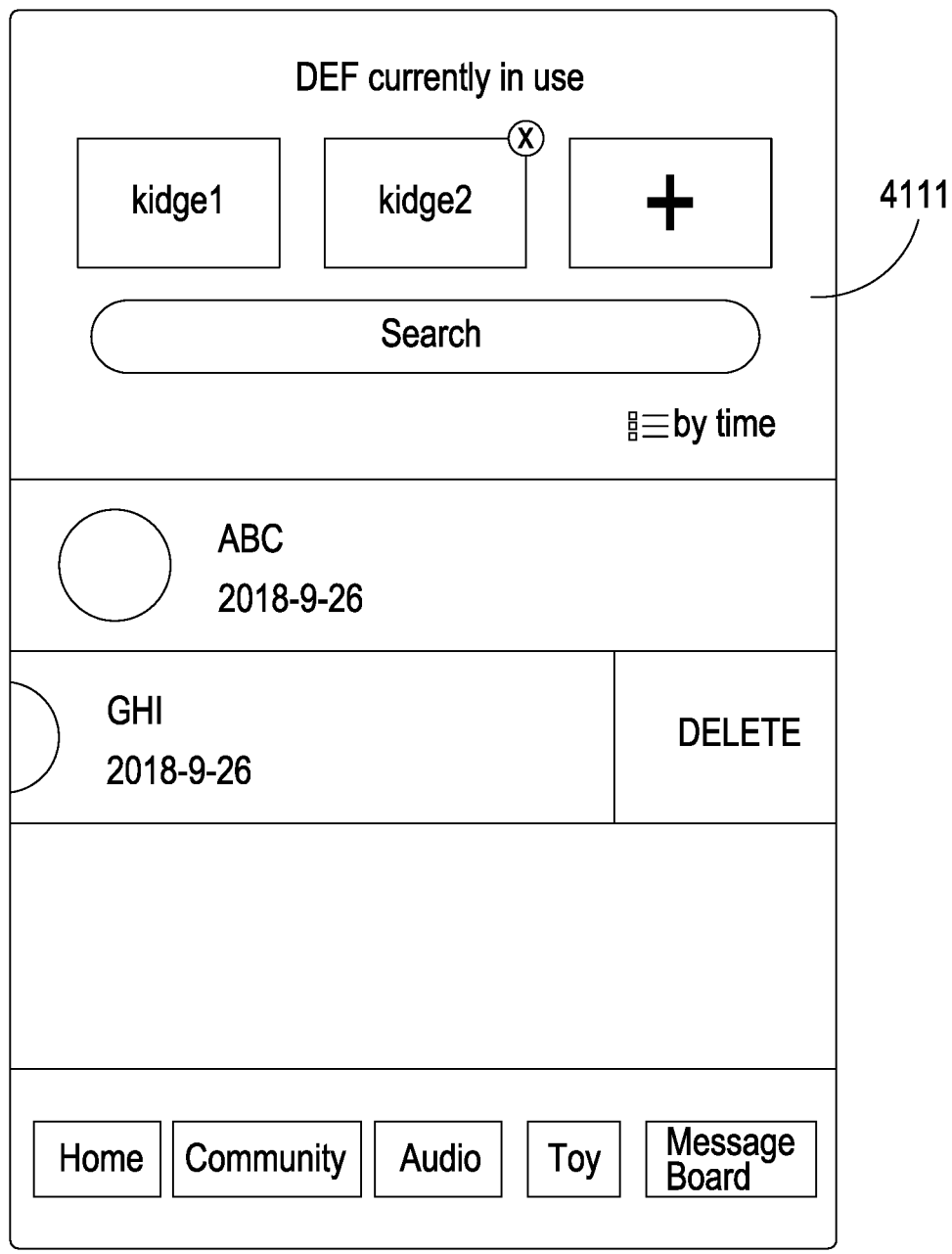
FIG. 6C shows an implementation view of adding an object in the intelligent audio playback and community sharing system according to the present invention.
Figure 6D:
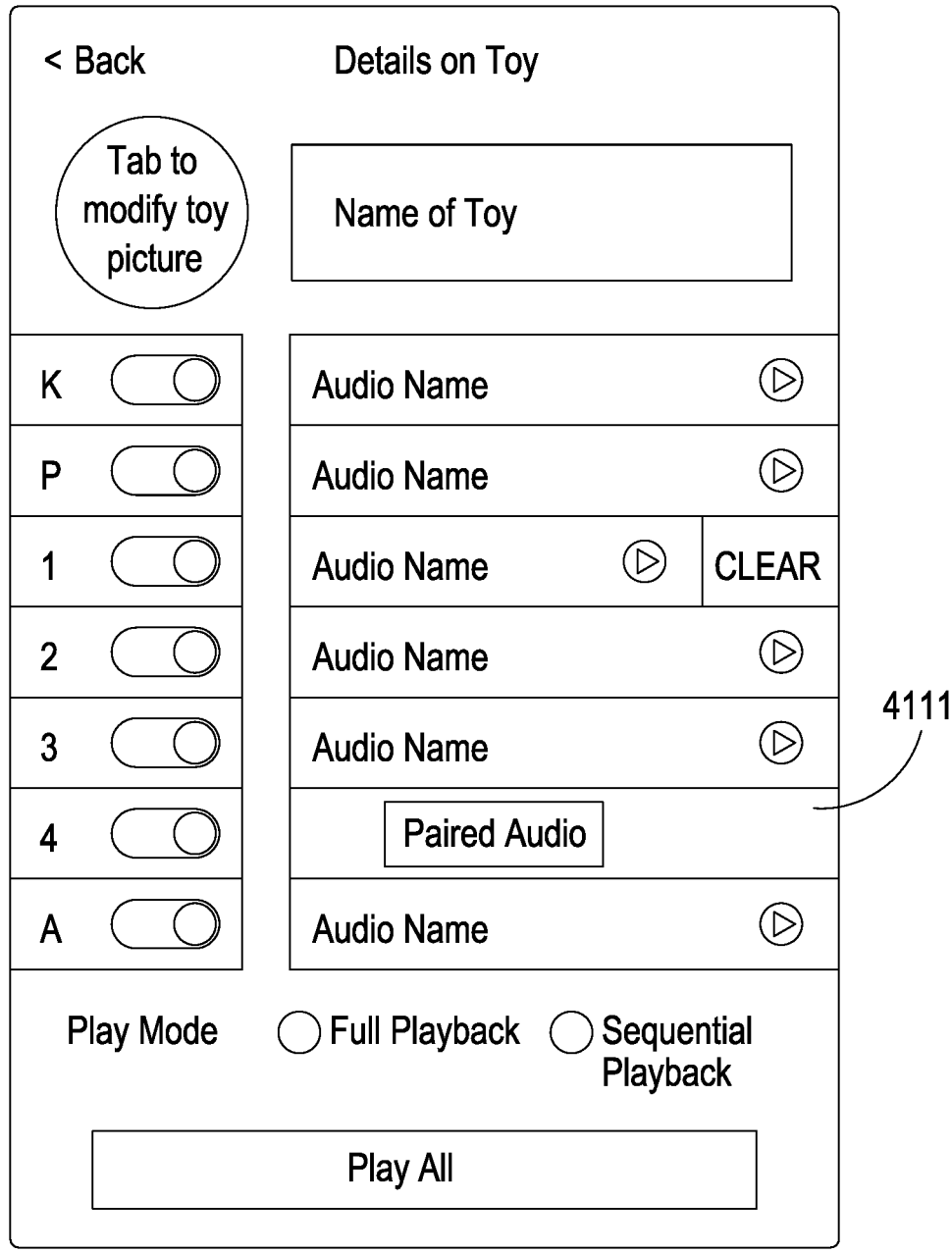
FIG. 6D shows an implementation view of adding an object in the intelligent audio playback and community sharing system according to the present invention.

Afterwards, in case the RFID reader in the sound box device 2 reads the wireless RF information coming from the RFID tag of the object body, as shown in FIGS. 6A and 6B, it is possible to add the newly placed object body (e.g., a toy) on the operation page 4111, then, as shown in FIG. 6C, so that the object body and the object file can be connected; subsequently, after selecting the object body (ABC), as shown in FIG. 6D, it is possible to change the audio data stored in the object file of the object body, in which the stored audio data may include the following format:

(1) Field K: audio data recorded via the sound box device, not to be cleared, but can be overwritten;

(2) Field P: audio data self-carried by the toy, not to be cleared, but the backend server equipment can overwrite it;

(3) Fields 1, 2, 3, 4: audio data to be added by the user, can be cleared;

(4) Field A: reserved space;

(5) Full Playback Field: when the corresponding object body is placed on the sound box device so as to trigger the activation, the ON audio data will be played back once for all; and (6) Sequential Playback Field: when the corresponding object body is placed on the sound box device so as to trigger the activation, an audio data (marked as ON) will be played back according to the KP1234A sequence for each placement of the object body.

Figure 7A:
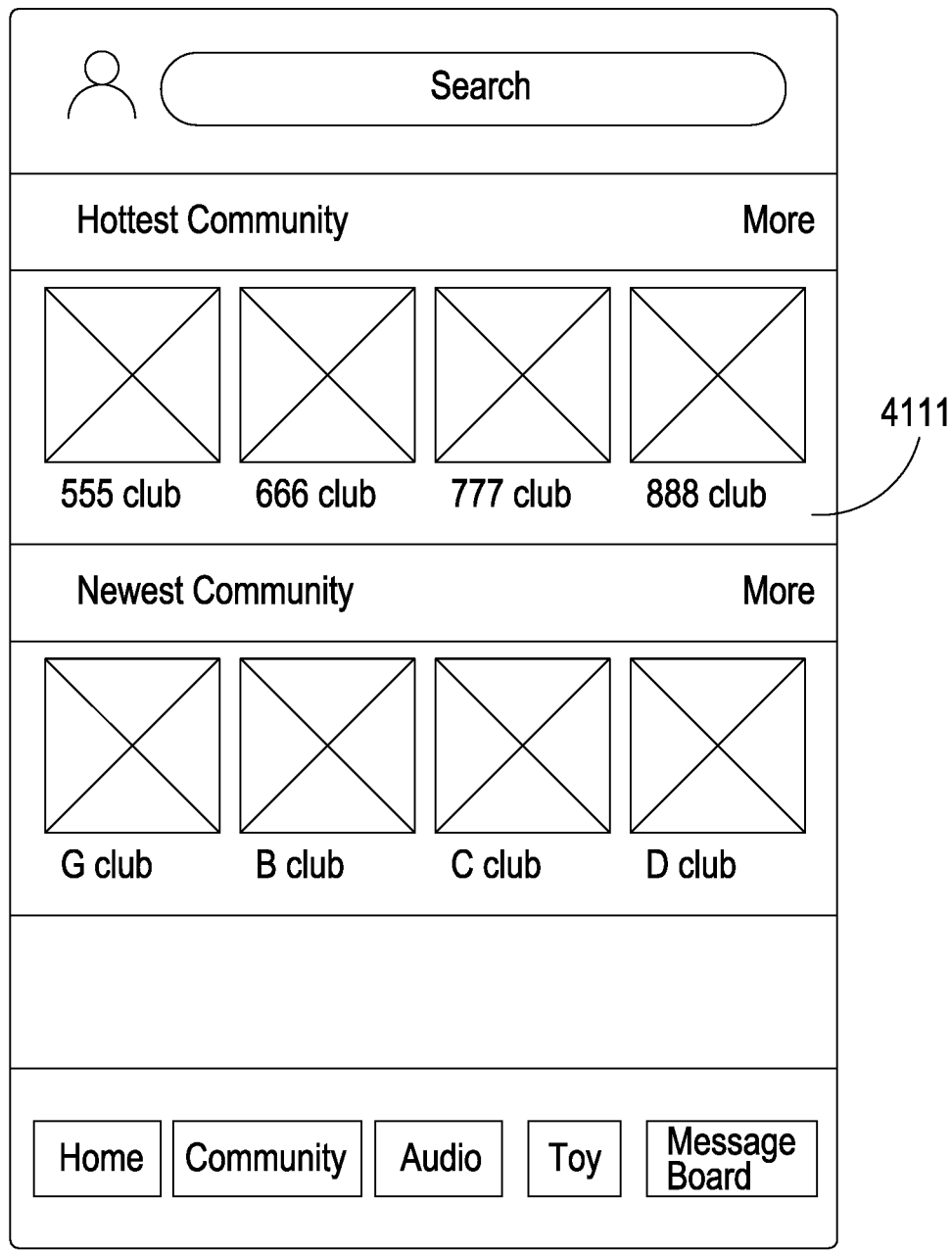
FIG. 7A shows an implementation view of inquiring audio signals in the intelligent audio playback and community sharing system according to the present invention.
Figure 7B:
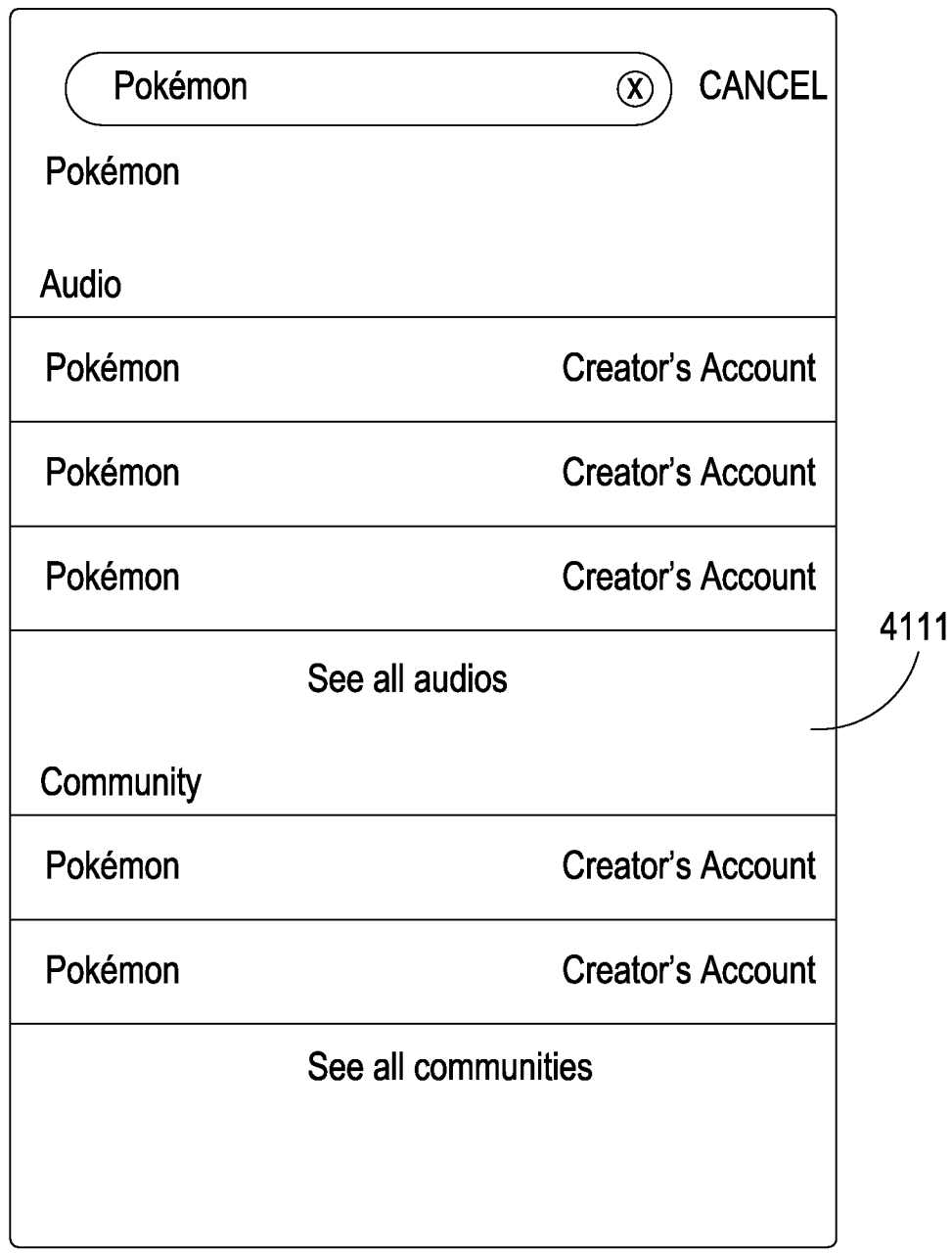
FIG. 7B shows an implementation view of inquiring audio signals in the intelligent audio playback and community sharing system according to the present invention.

Furthermore, as shown in FIGS. 7A and 7B, the user can see the most popular or the newest community in the community portion on the operation page 4111, and also search the wanted audio data and enter into the community thereby importing the audio data into the object file.

Figure 8B:
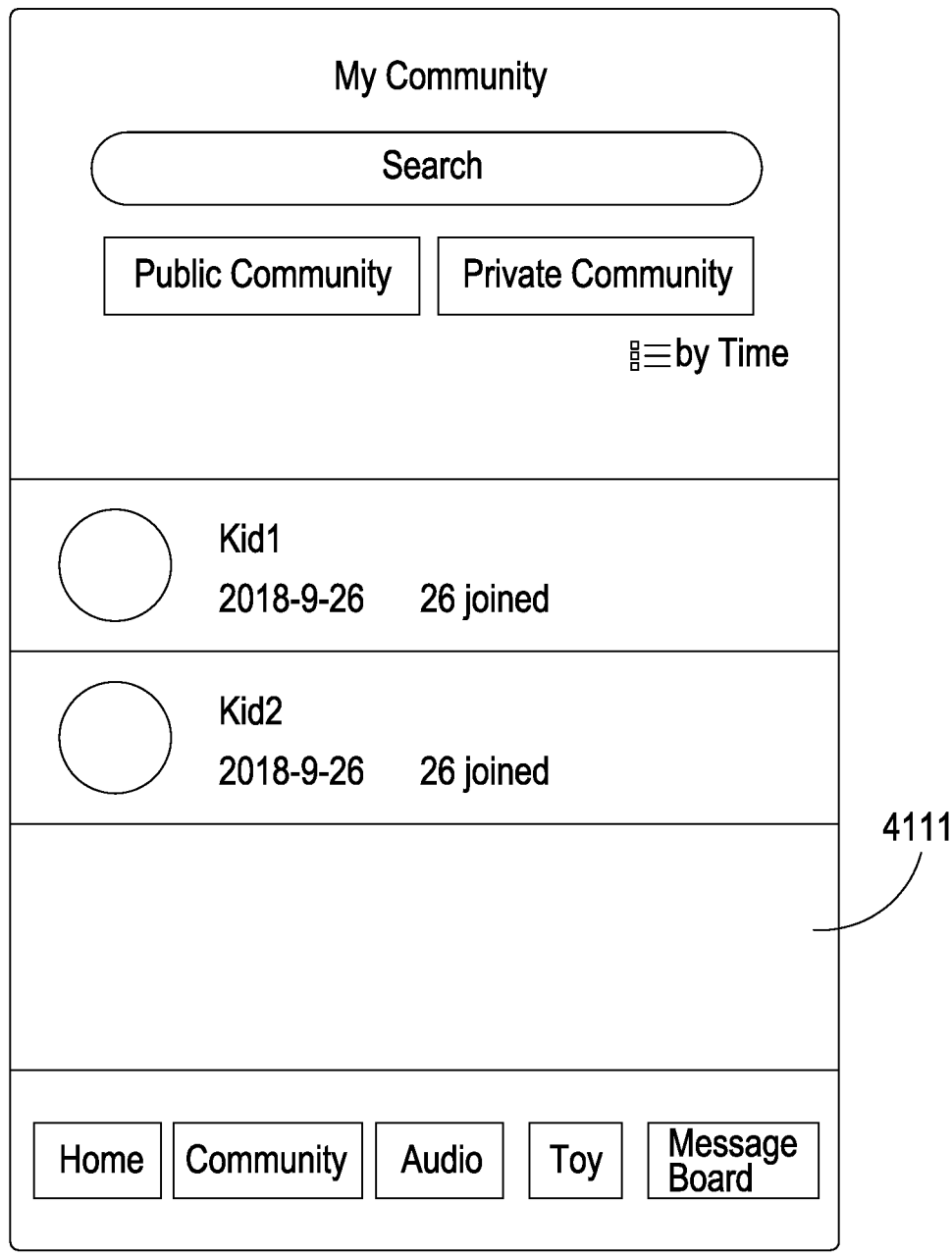
FIG. 8B shows an implementation view of community functions in the intelligent audio playback and community sharing system according to the present invention.
Figure 8C:
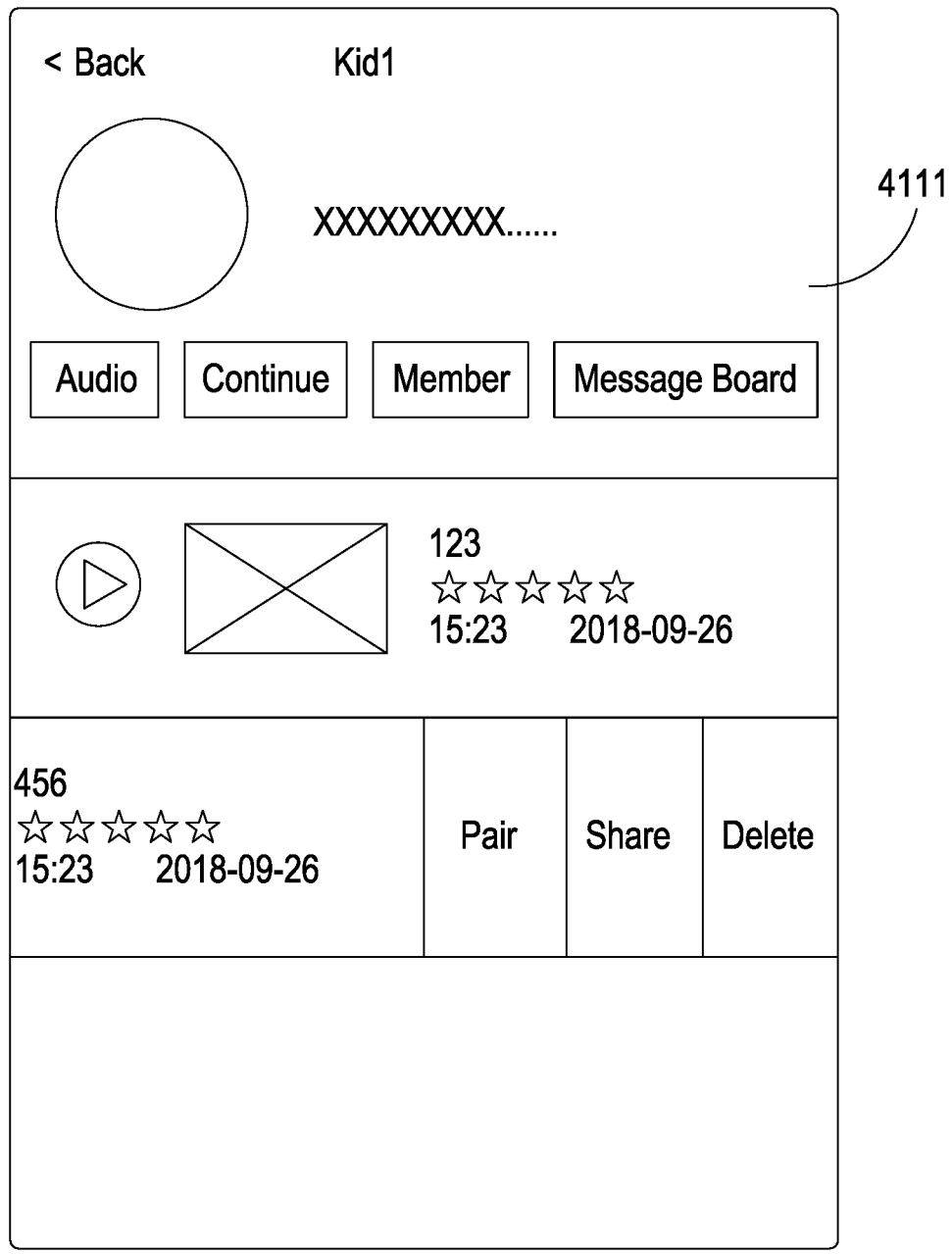
FIG. 8C shows an implementation view of community functions in the intelligent audio playback and community sharing system according to the present invention.

As shown in FIGS. 8A and 8B, the user may also build a community (a public community or private community, and configure the permission thereof); after building the community, it is possible to click thereon to enter, as shown in FIG. 8C, so that relevant information and audio signals of the community can be displayed; it should be understood that, in the community built by the user himself, its audio data can be paired with the object body, shared with friends and deleted, but in the community built by others, the audio data can be only paired with the object body and shared with friends.

Figure 8D:
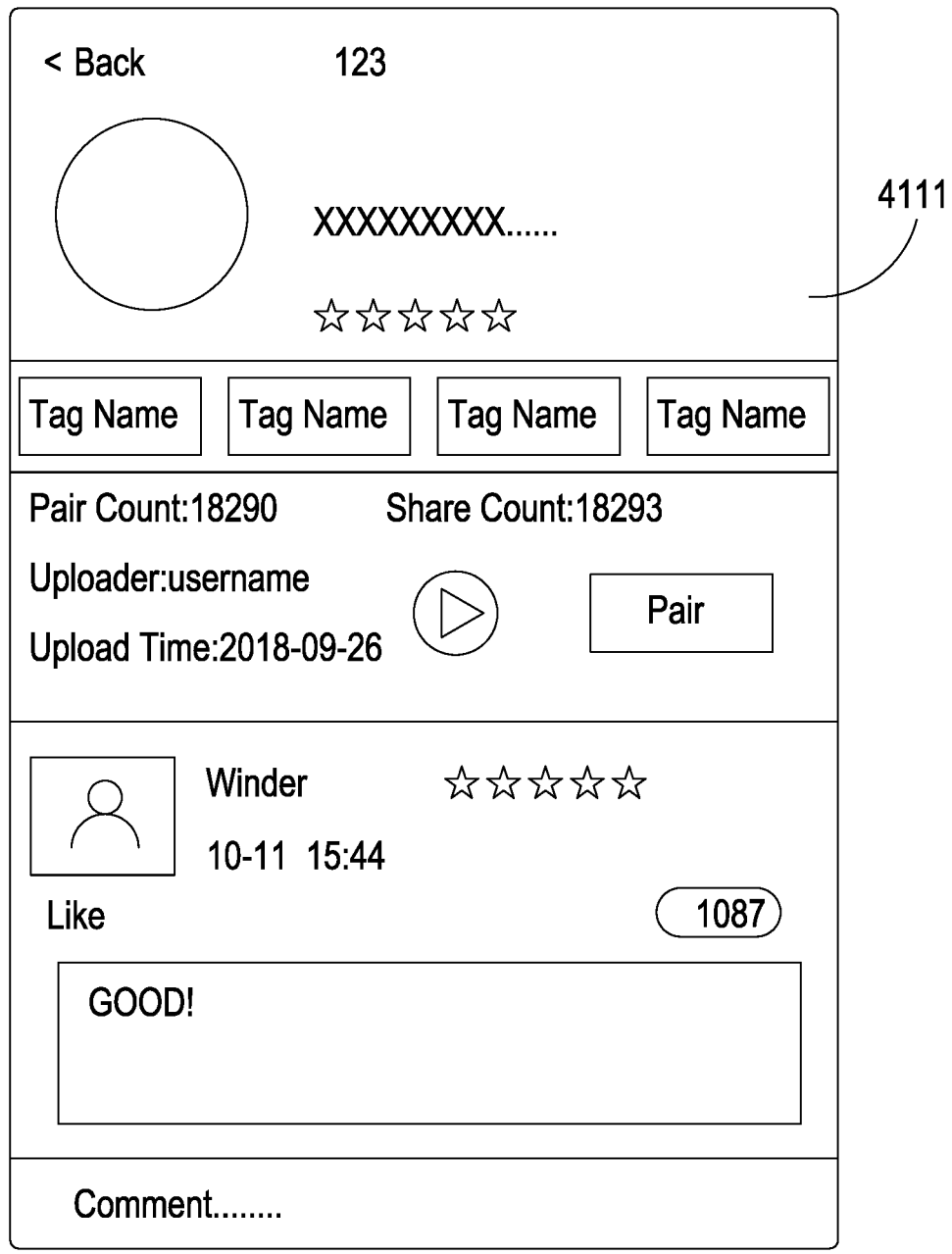
FIG. 8D shows an implementation view of community functions in the intelligent audio playback and community sharing system according to the present invention.

Additionally, as shown in FIG. 8D, it is also possible to choose the audio signals to browse the information (e.g., audio name, audio tag, pairing count, sharing count, uploader, upload time, audio comment, audio message area).

Figure 9A:
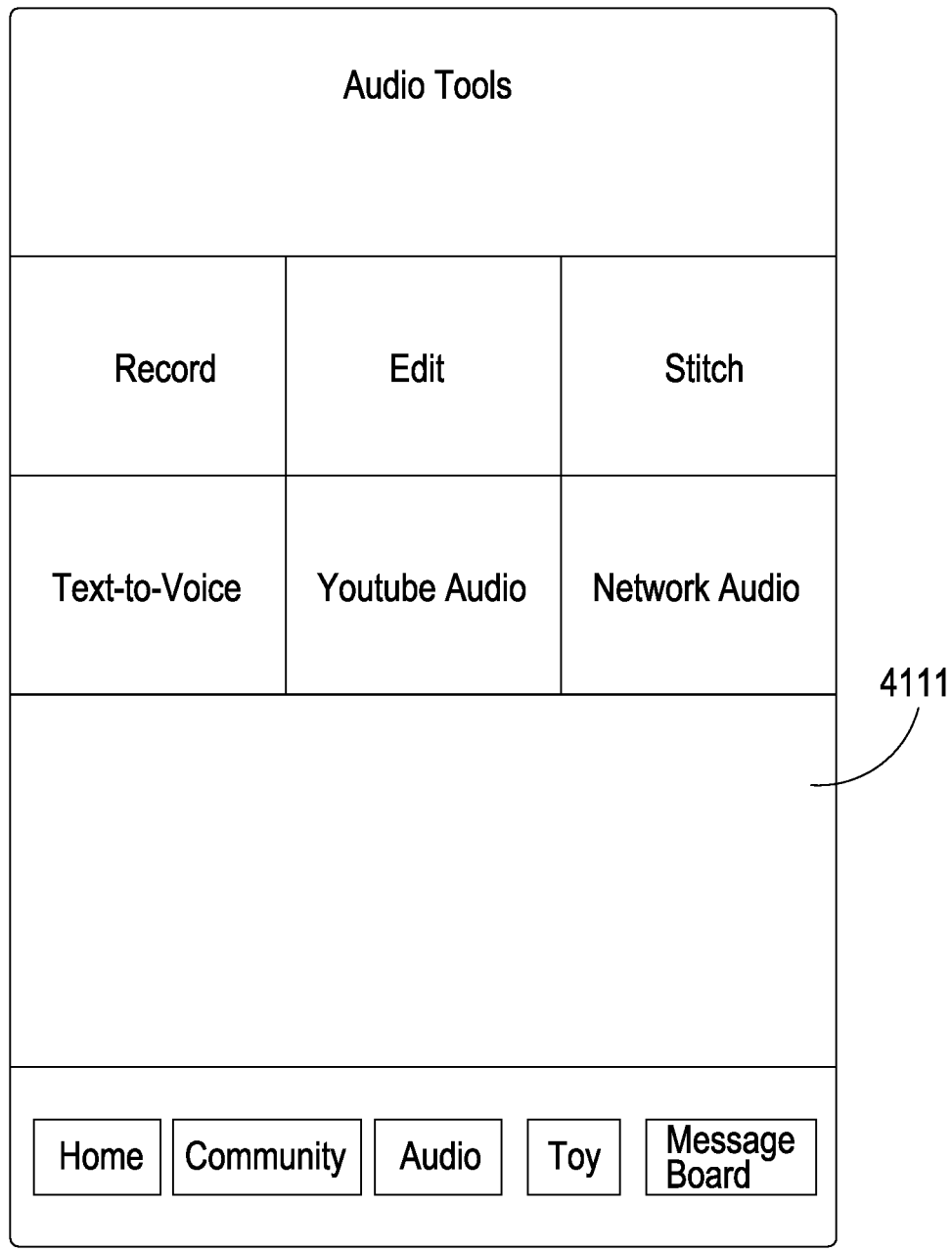
FIG. 9A shows an implementation view of editing audio signals in the intelligent audio playback and community sharing system according to the present invention.
Figure 9B:
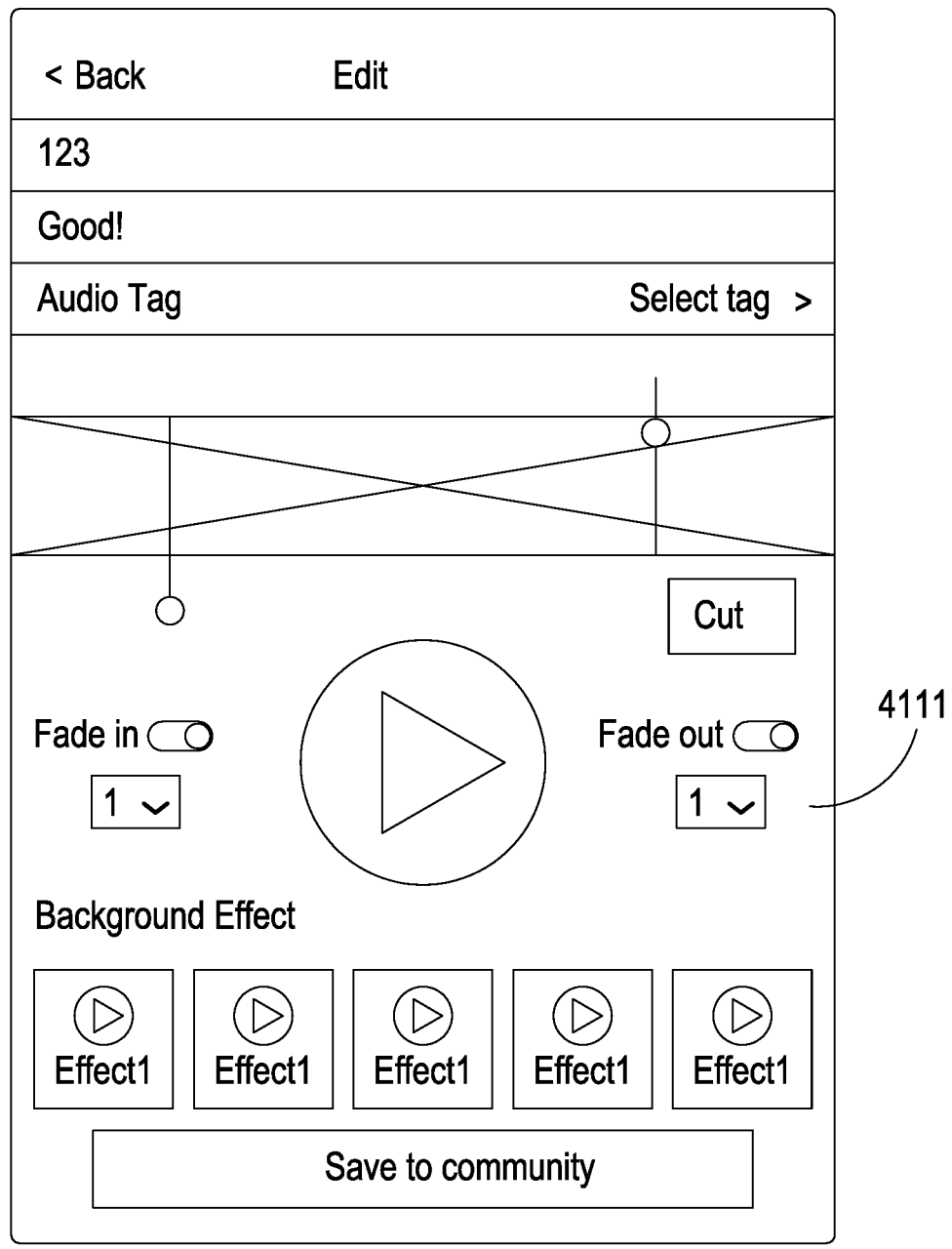
FIG. 9B shows an implementation view of editing audio signals in the intelligent audio playback and community sharing system according to the present invention.

As shown in FIG. 9A, on the operation page 4111, it is also possible to perform various functions, including audio recording, sound effect editing, audio stitching, text-to-speech conversion, audio file link input and/or audio file import etc., respectively explained as below:

(1) Audio recording is used for recording, and the audio data produced by the recording can be selected for publication in the community;

(2) Sound effect editing can be used to edit the sound effects, as shown in FIG. 9B, and the resulted audio data can be selected for publication in the community;

(3) Audio stitching is used to concatenate or connect at least two sets of audio signals, and the resulted audio data can be selected for publication in the community;

(4) Text-to-speech conversion is used to convert texts into audio signals, and the resulted audio data can be selected for publication in the community;

(5) Audio file link input can be used to input the link (URL) on the Http, and the inputted audio links can be selected for publication in the community; and (6) Audio file import can be used to import the audio signals from Cloud space, and the imported audio links or audio files can be selected for publication in the community.

Figure 10:
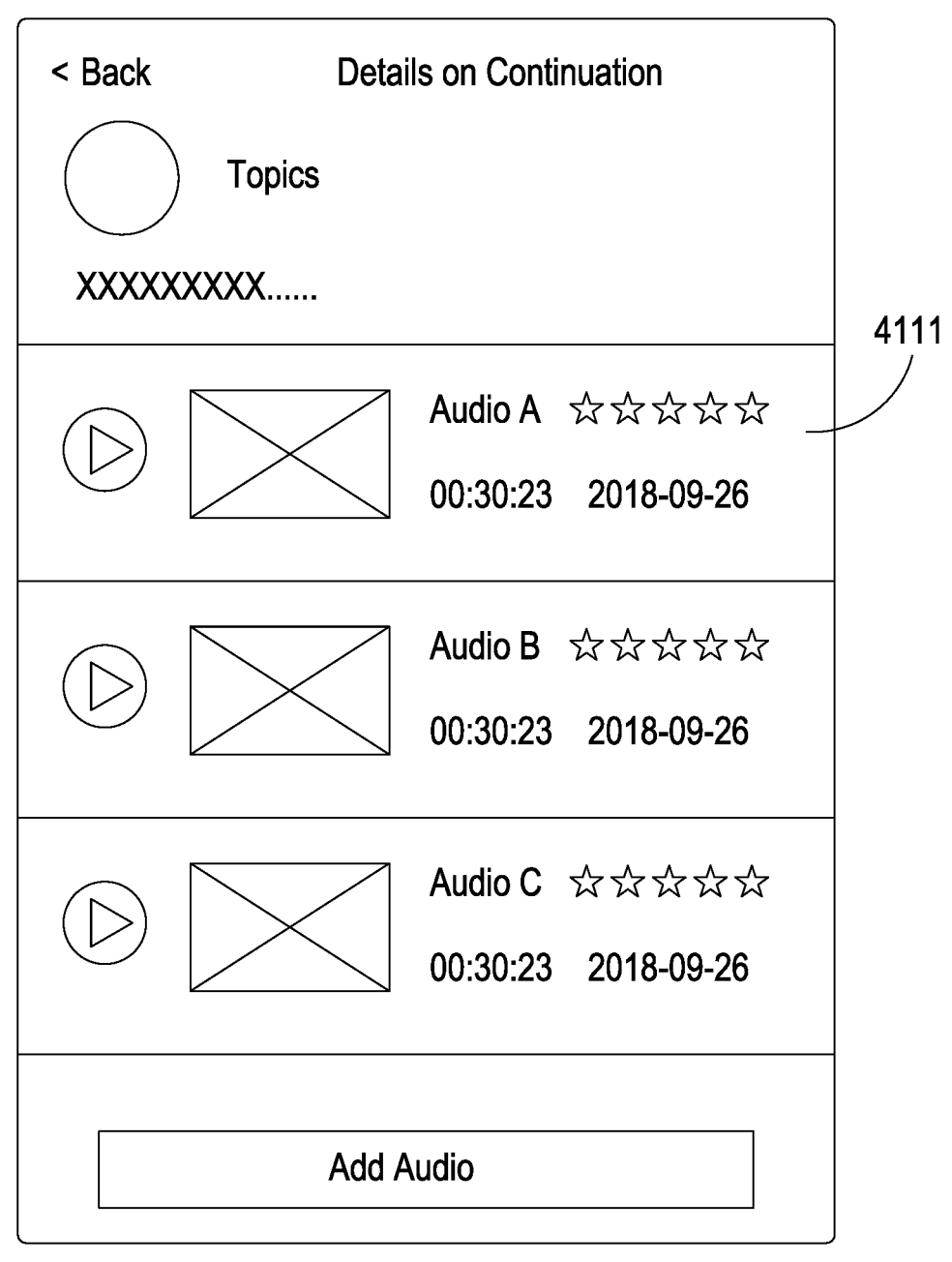
Figure 11:
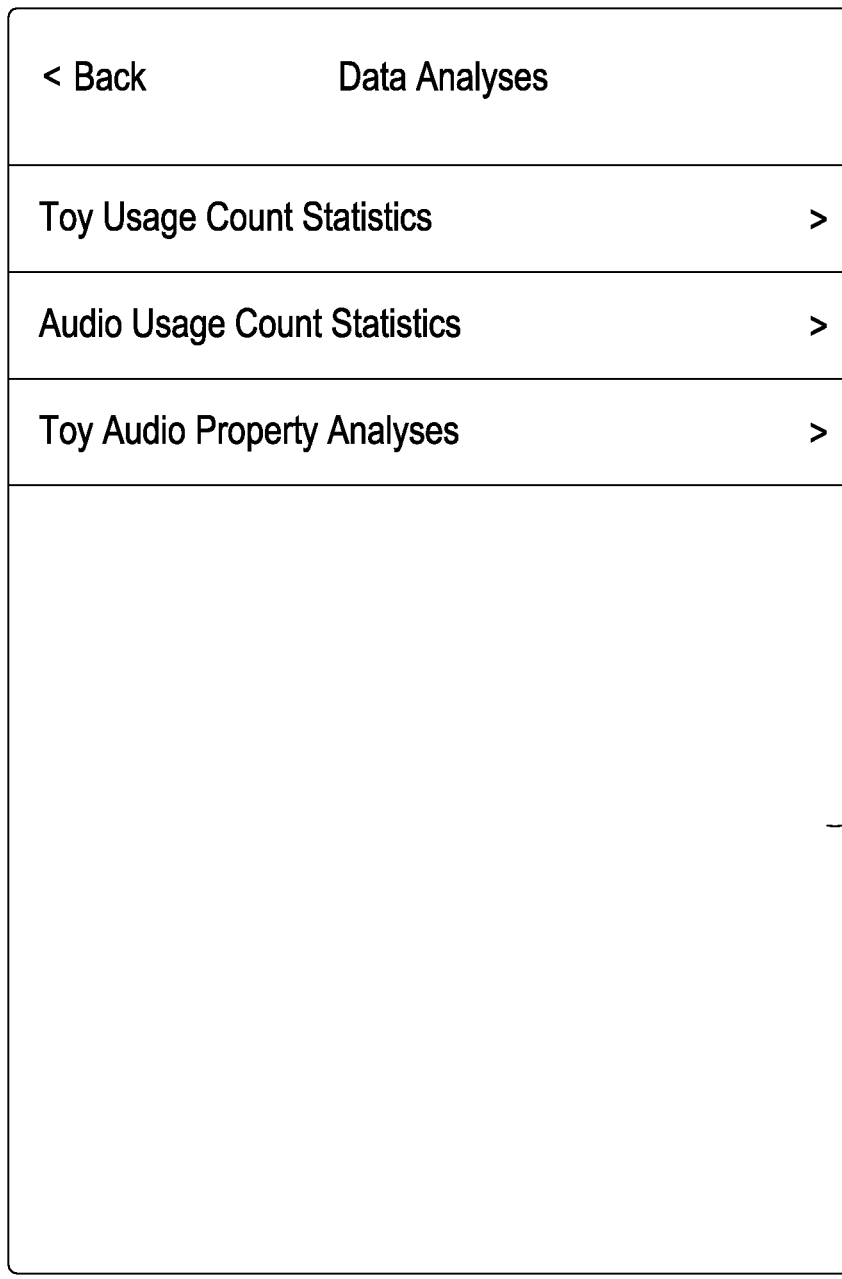
FIG. 11 shows an implementation view of data analyses in the intelligent audio playback and community sharing system according to the present invention.

Following this, as shown in FIG. 10, it is possible to publish tasks on the operation page 4111 thereby allowing other users to provide their audio signals to continue; also, as shown in FIG. 11, it may be desirable to execute statistical computations on the toy (object body), such as the usage count of the object body, the usage count of the audio file, and/or audio property analyses in the object file, in which the audio property may relate to a certain categorization approach, e.g., types, sorts, genres etc.

Figure 13:
FIG. 13 shows an implementation view of point accumulations in the intelligent audio playback and community sharing system according to the present invention.

Besides, as shown in FIG. 12, the message board on the operation page 4111 can be used to leave a message to inform the developers about software-related issues or other matters to be discussed; at the same time, as shown in FIG. 13, the system can further give points for different audio signals, and such points can be accumulated in accordance with different usage conditions (e.g., the sharing count or the pairing count), wherein the accumulated points can be later redeemed or converted into other features or for any purposes.

In comparison with other conventional technologies, the intelligent audio playback and community sharing system according to the present invention provides the following advantages:

(1) The present invention enables a user to place an object with an RFID tag on a sound box, and can directly connect to a backend server equipment in order to automatically play the audio file set by the APP on the electronic device, thereby offering greater convenience for users to operate.

(2) The present invention allows a user A (e.g., a parent) to operate an APP on an electronic device to select an audio file to be played, and a user B (e.g., a child) can put an RFID tagged object on the sound box so that the audio file selected and set by the user A can be automatically played; accordingly, in the present invention, the user operating the APP and the user of the speaker can be different.

(3) The sound box device of the present invention can automatically determine whether the audio file is to be played offline or online, so the audio file can be stored in the sound box device, or else directly connected to the backend server equipment on the Cloud, in order to play the audio signals corresponding to the RFID tag. Moreover, the present invention allows the user to edit the required playlists by himself, so the audio contents and the playback sequence can be modified based on the requirements to satisfy the user's demands.

(4) Seeing that the audio files can be stored in the sound box device, the present invention can operate asynchronously with the mobile phone; in other words, by simply pairing the sound box with the object with the RFID tag, the same or different users are capable of listening to different audio contents even under an offline condition or in an environment without computer networks.

(5) The present invention can create a community through the server space provided by the backend server equipment, so that the user can create, edit and multi-party create in the community, and the created or uploaded audio files can be further shared with different users.

It should be noticed that, although the present invention has been disclosed through the detailed descriptions of the aforementioned embodiments, such illustrations are by no means used to restrict the scope of the present invention; that is, those skilled ones in relevant fields of the present invention can certainly devise any applicable alternations and modifications after having comprehended the aforementioned technical characteristics and embodiments of the present invention without departing from the spirit and scope thereof. Hence, the scope of the present invention to be protected under patent laws should be delineated in accordance with the claims set forth hereunder in the present specification.

What is claimed is:

1. An intelligent audio playback and community sharing system, comprising:
 a backend server equipment, applied to store at least one object file and at least one community file, in which the object file includes at least one or more audio files and/or audio connections;
 an object body, combined with at least one RFID tag;
 a sound box device, capable of storing at least one audio signal files and including:
  a microcontroller, used to control the operations of the sound box device;
  a speaker body, connected to the microcontroller in order to play audio signals;
  an RFID reader, connected to the microcontroller thereby that, after the object body touches the sound box device, the RFID reader can read the wireless radio frequency (RF) information on the RFID tag of the object body; and
  a wireless transmission unit, connected to the microcontroller, which can be applied to perform wireless network connections with the backend server equipment in a wireless way and, based on the wireless RF information received by the RFID reader, acquire the corresponding object file in the backend server equipment; wherein the sound box device can play back, through the speaker body, the audio signals originated from the stored audio signal files or the object file acquired in the backend server equipment; and
 an application program, installed in an electronic device and comprising:
  an operation interface unit, used to provide different operation pages necessary for running the application program;
  a connection unit, used to connect to the backend server equipment via the electronic device;
  an object file management unit, connected to the connection unit and the operation interface unit and used for adding and/or editing object files on the operation page provided by the operation interface unit, and then uploading the added and/or edited object files to the backend server equipment, in which different object files correspond to different wireless RF information, and in which the object file management unit being able to further edit different audio files and/or audio-connected playback sequence, and the playback sequence having plural fields, one of the fields being used to store the audios recorded by means of the sound box device, while one of the other fields being used to store the audios brought by the object body itself, and further more fields being used to store added audios, with each field further having an ON/OFF switch;
  a community operation unit, connected to the connection unit and the operation interface unit and used for creating a new community or operating in a created community on the operation page provided by the operation interface unit, and then the generated data though operations can be stored as the community file and uploaded to the backend server equipment, in which the community operation unit can publish at least one audio file and/or audio link in at least one community on the operation page provided by the operation interface unit;
  an audio editor unit, connected to the object file management unit, the operation interface unit and the community operation unit and used for editing and creating a new audio file on the operation page provided by the operation interface unit; and
  an audio pairing unit, connected to the object file management unit, the operation interface unit and the community operation unit being used for adding at least one new audio file and/or audio link into at least one object file on the operation page provided by the operation interface unit, and the audio pairing unit being able to add an audio file and/or audio link published by at least one community on the operation page into a field of at least one object file, in which the field is used to store the added audio file.

2. The intelligent audio playback and community sharing system according to claim 1, wherein the application program further comprises an account management unit connected to the connection unit and the operation interface unit and used for adding or editing a user file having at least a user account and a password on the operation page provide by the operation interface unit, and the user file can be uploaded and stored to the backend server equipment, with each user file being correspondingly installed with at least one object file.

3. The intelligent audio playback and community sharing system according to claim 2, wherein the application program further comprises an account log-in unit connected to the connection unit and the operation interface unit and used for inputting the user account and password on the operation page provided by the operation interface unit in order to perform the account log-in process.

4. The intelligent audio playback and community sharing system according to claim 1, wherein the community operation unit can further share the audio files and/or audio links published on the operation page by way of a communication software, a community software and/or an email software.

5. The intelligent audio playback and community sharing system according to claim 1, wherein the community operation unit can further leave a comment and/or tab for ratings in at least one community on the operation page.

6. The intelligent audio playback and community sharing system according to claim 1, wherein the community operation unit can further configure access permissions of different community files thereby limiting the users that the community can operate.

7. The intelligent audio playback and community sharing system according to claim 1, wherein the community operation unit can be further used to invite different users to enter into at least one community.

8. The intelligent audio playback and community sharing system according to claim 1, wherein the community operation unit can be further used to delete the audio files and/or audio links published in at least one community on the operation page.

9. The intelligent audio playback and community sharing system according to claim 1, wherein the community operation unit can be further used to allow one or more users to publish a plurality of consecutive or associated audio files and/or audio links on the operation page.

10. The intelligent audio playback and community sharing system according to claim 1, wherein the community operation unit can further correspondingly specify an accumulative point with respect to each audio file and/or audio link in the community, and the accumulative point can be shown on the operation page.

11. The intelligent audio playback and community sharing system according to claim 1, wherein the audio editor unit provides functions including audio recording, sound effect editing, audio stitching, text-to-speech conversion, audio file link input and/or audio file import etc.

12. The intelligent audio playback and community sharing system according to claim 1, wherein the application program further comprises a statistics unit connected to the connection unit and the operation interface unit and used for statistically computing the usage count of the object file, the usage count of the audio file, and/or the usage count of the audio signal connection.

\* \* \* \* \*